(12) United States Patent
Noujeim et al.

(10) Patent No.: US 11,372,100 B2
(45) Date of Patent: Jun. 28, 2022

(54) RADAR OBJECT CLASSIFICATION AND COMMUNICATION USING SMART TARGETS

(71) Applicant: Baidu USA LLC, Sunnyvale, CA (US)

(72) Inventors: Karam Noujeim, Sunnyvale, CA (US); Mei-Li Chi, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 312 days.

(21) Appl. No.: 16/168,589

(22) Filed: Oct. 23, 2018

(65) Prior Publication Data

US 2020/0124719 A1 Apr. 23, 2020

(51) Int. Cl.
*G01S 13/931* (2020.01)
*G05D 1/00* (2006.01)
*G05D 1/02* (2020.01)
*G06V 20/58* (2022.01)

(52) U.S. Cl.
CPC .......... *G01S 13/931* (2013.01); *G05D 1/0088* (2013.01); *G05D 1/0257* (2013.01); *G06V 20/58* (2022.01); *G01S 2013/9329* (2020.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,983,838 B1* | 7/2011 | Mislan | G05D 1/0265 701/466 |
| 9,059,505 B1* | 6/2015 | Asrani | H01Q 9/145 |
| 10,175,340 B1* | 1/2019 | Abari | G06K 9/00805 |
| 10,386,480 B1* | 8/2019 | Campbell | G01S 13/30 |
| 2005/0200453 A1* | 9/2005 | Turner | G07C 9/257 340/10.41 |
| 2010/0167334 A1* | 7/2010 | Williamson, IV | G16H 10/40 235/487 |
| 2012/0161931 A1* | 6/2012 | Karmakar | G01S 13/825 235/492 |
| 2014/0136046 A1* | 5/2014 | Smith | G01C 21/165 701/25 |
| 2015/0145711 A1* | 5/2015 | Maddox | G01S 13/931 342/27 |
| 2015/0263425 A1* | 9/2015 | Gillard | H01Q 15/0013 342/6 |

(Continued)

*Primary Examiner* — Marcus E Windrich
(74) *Attorney, Agent, or Firm* — Womble Bond Dickinson (US) LLP

(57) ABSTRACT

A radar system for an autonomous driving vehicle (ADV) is disclosed. The system includes a target that includes a number of target elements disposed in a predetermined configuration on the target to collectively represent a radar readable code. The system further includes a radar unit included in the ADV and configured to: transmit a first electromagnetic (EM) signal to the target within a driving environment, receive a second EM signal reflected by the target, compute a radar cross section (RCS) signature based on the received second EM signal, generate a corresponding communication message based on the computed RCS signature, and transmit radar data that includes the communication message, where the ADV is controlled based on the communication message.

12 Claims, 10 Drawing Sheets

(56) References Cited

U.S. PATENT DOCUMENTS

| | | | |
|---|---|---|---|
| 2015/0303581 A1* | 10/2015 | Bodo | G01S 13/751 342/7 |
| 2015/0355318 A1* | 12/2015 | Durand | G01S 13/933 342/5 |
| 2018/0009330 A1* | 1/2018 | Ricci | G07C 5/02 |
| 2018/0165526 A1* | 6/2018 | Yoon | G01S 13/751 |
| 2019/0064839 A1* | 2/2019 | Sakai | G05D 1/0212 |
| 2019/0079194 A1* | 3/2019 | Kuffner | G08G 1/162 |
| 2019/0080612 A1* | 3/2019 | Weissman | G08G 1/164 |
| 2020/0025575 A1* | 1/2020 | Weissman | G01S 17/06 |
| 2021/0119817 A1* | 4/2021 | DeLapa | H04L 12/1822 |

* cited by examiner

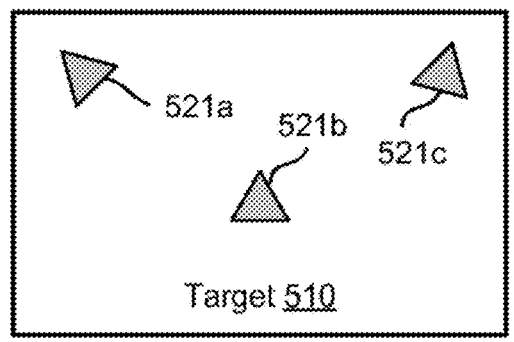
FIG. 5A
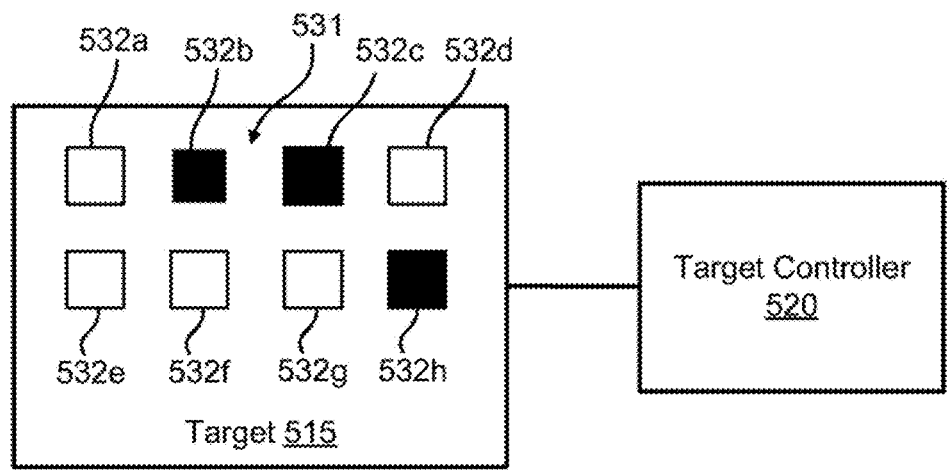
FIG. 5B
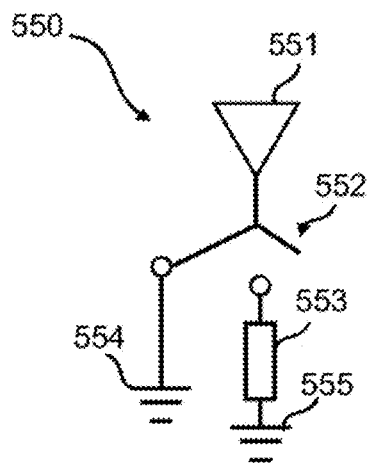      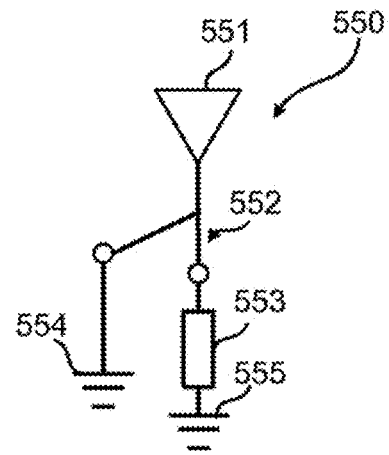
FIG. 5C            FIG. 5D

RADAR OBJECT CLASSIFICATION AND COMMUNICATION USING SMART TARGETS

TECHNICAL FIELD

Embodiments of the present disclosure relate generally to radar systems. More particularly, embodiments of the disclosure relate to radar object classification and communication using smart targets.

BACKGROUND

Vehicles operating in an autonomous mode (e.g., driverless) can relieve occupants, especially the driver, from some driving-related responsibilities. When operating in an autonomous mode, the vehicle can navigate to various locations using an onboard sensor system, allowing the vehicle to travel with minimal human interaction or in some cases without any passengers. The sensor system includes, among other things, one or more cameras, global positioning system (GPS), an inertial measurement unit (IMU), and a light detection and range (LIDAR) unit to track its surroundings (e.g., other vehicles, pedestrians, buildings, traffic signs, etc.). The sensor system also includes a radar (also referred to as radio detection and ranging) unit, which is an object-detection system that uses radio waves to determine, for example, the range, angle, or velocity of objects.

Radars have been used in many applications, including autonomous driving systems (e.g., autonomous vehicle). A radar consists of a transmitter, receiver, mixed-signal circuits, and a signal processing module. By transmitting an electromagnetic signal toward an object and receiving the reflected signal back, radar has been utilized for measuring the distance and speed of objects within an environment. While automotive radar has been used to measure signals reflected from objects, it has not been utilized for object classification and information communication (e.g. traffic) using smart radar targets. Detection of reflected signals from smart radar targets is key to communicating with different radar targets.

BRIEF DESCRIPTION OF THE DRAWINGS

Embodiments of the disclosure are illustrated by way of example and not limitation in the figures of the accompanying drawings in which like references indicate similar elements.

FIGS. 5A-5B are diagrams illustrating exemplary targets according to one embodiment.

FIGS. 5C-5D are diagrams illustrating an exemplary circuitry of a target element according to one embodiment.

DETAILED DESCRIPTION

Figure 1:
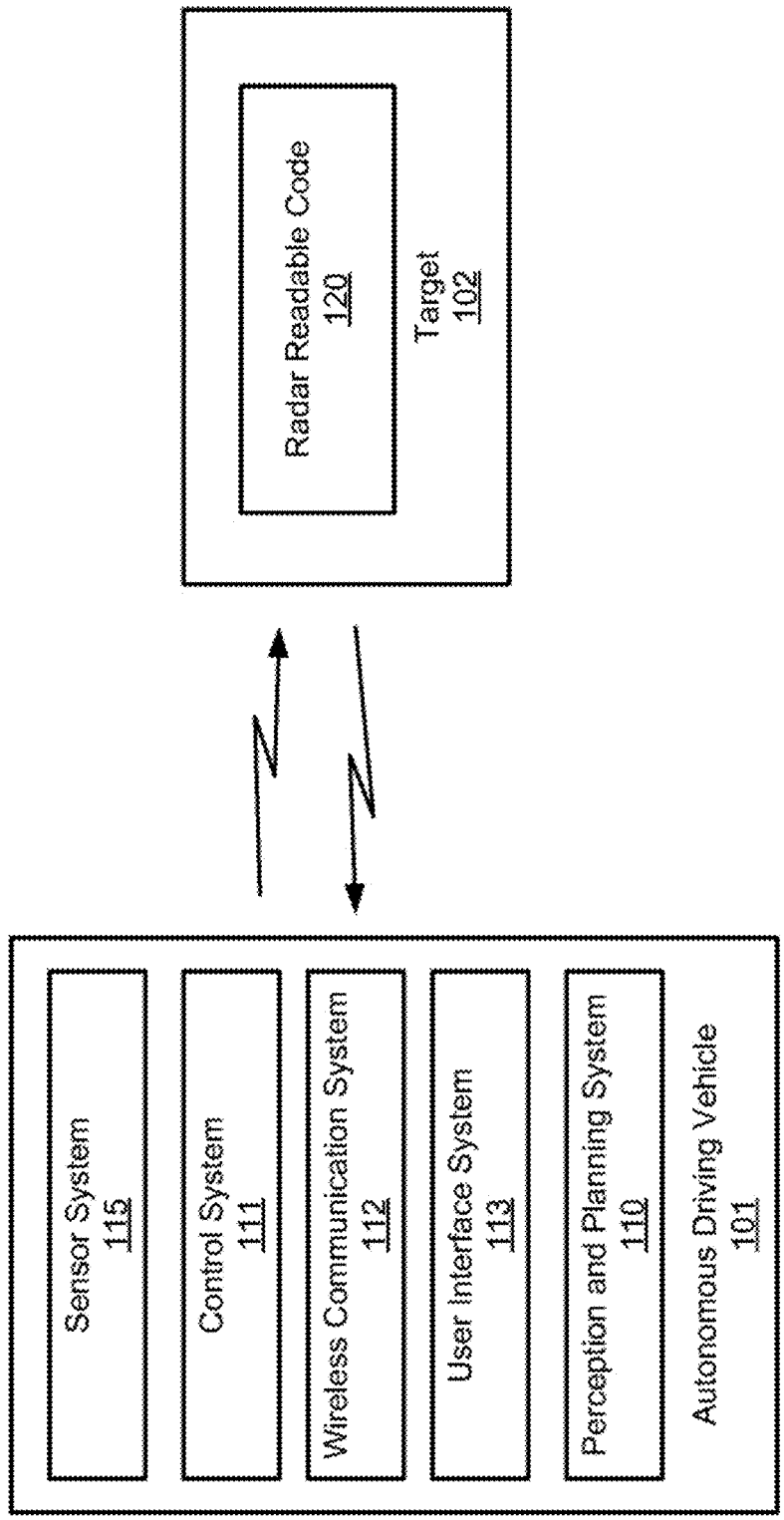
FIG. 1 is a block diagram illustrating an example of an autonomous driving vehicle according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a radar system for an autonomous driving vehicle (ADV) includes a target that includes a number of target elements disposed in a predetermined configuration on the target to collectively represent a radar readable code. The system further includes a radar unit included in the ADV and configured to: transmit a first electromagnetic (EM) signal to the target within a driving environment, receive a second EM signal reflected by the target, compute a radar cross section (RCS) signature based on the received second EM signal, generate a corresponding communication message based on the computed RCS signature, and transmit radar data that includes the communication message, where the ADV is controlled based on the communication message.

In one embodiment, the target elements manipulate the second EM signal to produce a specific radar cross section (RCS) when received by the radar unit. In one embodiment, the target is in a form of a plate or a patch. In one embodiment, the target elements are programmable by a target controller to collectively represent the radar readable code, and the target controller selectively configures each of the target elements to be in an ON state or an OFF state.

In one embodiment, for each of the target elements, the target element reflects electromagnetic signals when being configured in the ON state, and absorbs electromagnetic signals when being configured in the OFF state. In one embodiment, the target elements are engravings or indentations on the target. In one embodiment, to compute the RCS signature, the radar unit is further configured to use the RCS signature as an index into a lookup table to obtain the corresponding communication message. In one embodiment, the corresponding communication message includes object information classifying an object or communication information.

According to some embodiments, a method performed by a radar unit of an autonomous driving vehicle (ADV) is described. The method includes transmitting a first electromagnetic (EM) signal to a target within a driving environment, where the target includes a number of target elements disposed in a predetermined configuration on the target to collectively represent a radar readable code. The method further includes receiving a second EM signal reflected by the target. The method further includes computing a radar cross section (RCS) signature based on the received second EM signal. The method further includes generating a corresponding communication message based on the computed RCS signature. And the method includes transmitting radar data that includes the communication message, wherein the ADV is controlled based on the communication message.

According to some embodiments, a radar target is described. The target includes a number of target elements disposed in a predetermined configuration on the target to collectively represent a radar readable code. The target elements manipulate an electromagnetic signal that reflects off the radar target to produce a specific radar cross section (RCS).

In this way, using the target with the radar unit to generate a communication message, an optimal path or route can be generated to operate the ADV, thereby increasing safety (e.g., collision avoidance) while operating the ADV within the driving environment.

FIG. 1 is a block diagram illustrating an autonomous driving vehicle according to one embodiment. An autonomous driving vehicle (ADV) refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

Referring to FIG. 1, in one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

In one embodiment, sensor system 115 includes, but it is not limited to, one or more cameras, global positioning system (GPS) unit, inertial measurement unit (IMU), radar unit (e.g., radar unit 201 as described in more detail herein below), and a light detection and range (LIDAR) unit. The GPS unit may include a transceiver operable to provide information regarding the position of the autonomous vehicle. The IMU unit may sense position and orientation changes of the autonomous vehicle based on inertial acceleration. The radar unit may represent a system that utilizes radio signals to sense objects within the local environment of the autonomous vehicle. In some embodiments, in addition to sensing objects, the radar unit may additionally sense the speed and/or heading of the objects. As further shown in FIG. 1, in some embodiments, the radar unit may communicate with a target 102 to receive a communication message from the target 102 (as described in more detail herein below). For example, the radar unit may read a radar readable code 120 included in target 102. The code 120 may represent a communication message conveyed to the radar unit. The LIDAR unit may sense objects in the environment in which the autonomous vehicle is located using lasers. The LIDAR unit could include one or more laser sources, a laser scanner, and one or more detectors, among other system components. The cameras may include one or more devices to capture images of the environment surrounding the autonomous vehicle. In some embodiments, the cameras may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, a steering unit, a throttle unit (also referred to as an acceleration unit), and a braking unit. The steering unit is to adjust the direction or heading of the vehicle. The throttle unit is to control the speed of the motor or engine that in turn controls the speed and acceleration of the vehicle. The braking unit is to decelerate the vehicle by providing friction to slow the wheels or tires of the vehicle.

In one embodiment, wireless communication system 112 is to allow communication between autonomous vehicle 101 and external systems, such as devices, sensors, other vehicles, etc. For example, wireless communication system 112 can wirelessly communicate with one or more devices (e.g., servers) directly or via a communication network. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Based on the real-time traffic information, MPOI information, and location information, as well as real-time local environment data detected or sensed by sensor system 115 (e.g., obstacles, objects, nearby vehicles, etc.), perception and planning system 110 can plan an optimal route and drive vehicle 101, for example, via control system 111, according to the planned route to reach the specified destination safely and efficiently.

Figure 2:
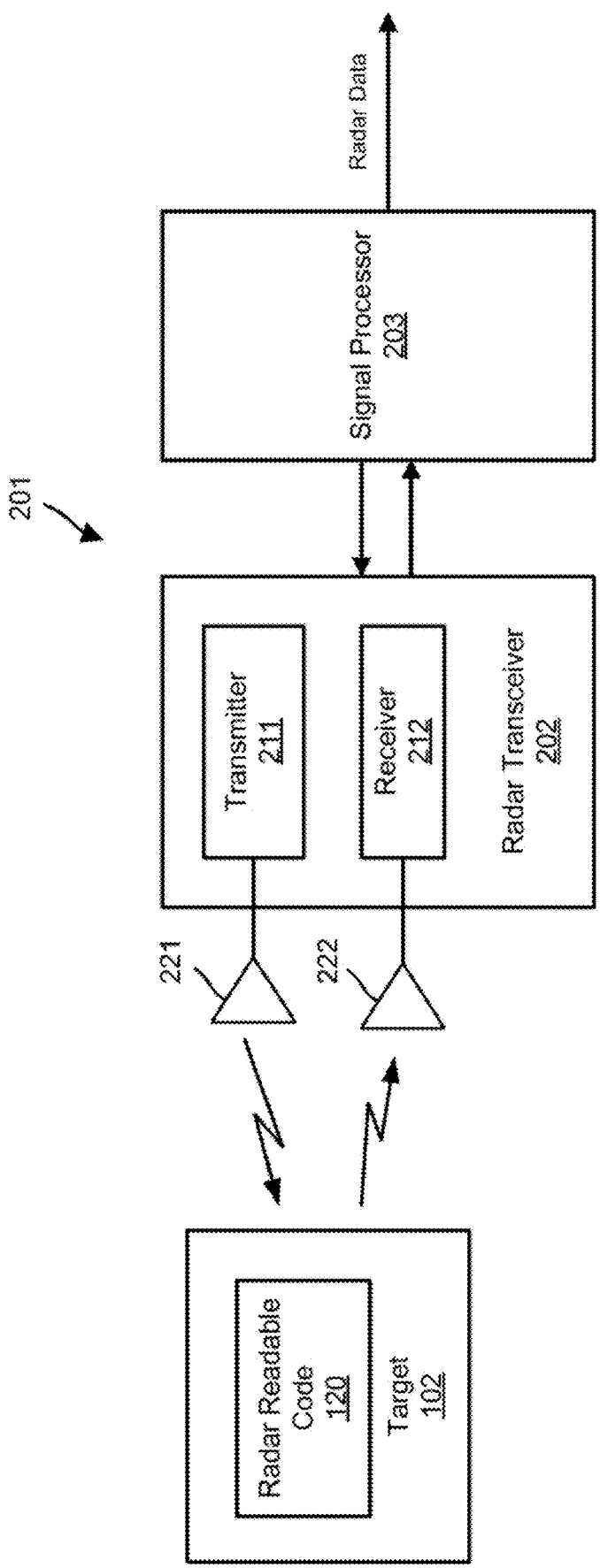
FIG. 2 is a block diagram illustrating a radar system according to one embodiment.

FIG. 2 is a block diagram illustrating a radar system according to one embodiment. Referring to FIG. 2, radar system 200 includes radar unit 201 and target 102 (also referred to as radar target). As shown, radar unit 201 (also referred to as radar system or radar device) may include, but not limited to, radar transceiver 202 and signal processor 203. Transceiver 202 includes a transmitter 211 connected or coupled to a transmitting antenna 221. Based on modulated signals received from signal processor 203, transmitter 211 produces electromagnetic signals (or waves) in radio or microwave domains that are transmitted via transmitting antenna 221. The signals may be transmitted in pulses or continuous wave (CW). Transceiver 202 further includes a receiver 212 connected or coupled to a receiving antenna 222. Receiving antenna 222 may receive electromagnetic signals within an environment and convert the electromagnetic signals into antenna output signals (e.g., electrical signals). The antenna output signals may be provided to receiver 212 which may include one or more amplifiers for amplifying the antenna output signals, although the amplifiers may be optional. The amplified or unamplified signals (also referred to as receiver output signals) may then be provided to signal processor 203 for subsequent processing to produce radar data. It should be noted that while FIG. 2 illustrates a transmitting antenna 221 and receiving antenna 222, as one of ordinary skill of the art would appreciate, a single antenna may be utilized to transmit and receive electromagnetic signals in some embodiments. In one embodiment, antennas 221-222 may be omnidirectional antenna, phased array antenna, passive phased array antenna, or active phased array antenna.

In operation, some or all of electromagnetic signals transmitted by transmitting antenna 221 may be reflected (or scattered) off target 102. That is, the electromagnetic signals may hit a portion of target 102 at an incident angle that includes radar readable code 120, and reflect or bounce back toward receiving antenna 222 at a reflected (or scattering) angle, providing information that can be translated (or decoded) into a communication message.

In more detail, referring now to FIG. 5A, which illustrates an exemplary target according to one embodiment, target 510 may include target elements 521*a-c* that collectively represent a radar readable code (e.g., radar readable code 120). In one embodiment, target 510 may be target 102 of FIGS. 1 and 2. Target 510 may be formed with any material, for example plastic, conductive material (e.g., metal), fabric, etc. Target 510 may be mounted on (or attached to) an object, for example a car, a human (e.g., traffic controller), a motorcycle, a bicycle, a bus, a truck, a building, traffic related signs (e.g., stop signs, yield signs), etc. In one embodiment, target 510 may be in the form of a plate, such as a license plate of a vehicle. In another embodiment, target 510 may be a patch attached to a uniform, for example uniform of a traffic controller or a person who directs traffic.

Target elements 521*a-c* may be of any form, such as engravings or indentations of any shapes and sizes on target 510. Target elements 521*a-c* may also be reflective elements made of conductive (or radar reflecting) material (e.g., metal pieces), where target elements 521*a-c* are attached to target 510. It should be noted that in FIG. 5A, the triangles representing elements 521*a-c* are for illustration purposes only. Target elements 521*a-c* may be of any shape and size, may be any number of elements, and may be disposed anywhere on target 510. Alternatively, in some embodiments, target elements 521*a-c* may be disposed directly on an object (e.g., a car, a human (e.g., traffic controller), a motorcycle, a bicycle, a bus, a truck, a building, traffic related signs (e.g., stop signs, yield signs), etc.) instead of target 510. The elements 521*a-c* on target 510 are disposed in predetermined positions (or configuration) such that when electromagnetic signals hit target 510, elements 521*a-c* manipulate or cause the reflecting (or bounce back) signals to produce a specific radar cross section (RCS) when received and processed by radar unit 201. RCS refers to a description of how an object (also refers to as target) reflects an incident electromagnetic signal.

Referring now to FIG. 5B, which illustrates an exemplary target according to another embodiment, target 515 may include a programmable radar readable code 531. In one embodiment, target 515 may be target 102 of FIGS. 1 and 2. As shown, radar readable code 531 may be represented by a number of target elements 532*a-h*, which may be disposed in an array configuration or any other configuration. Elements 532*a-h* may be formed with reflection-changing material (or circuitry) so that they can selectively be turned ON or OFF. That is, each element can be configured to reflect, or absorb (or weakly reflect) electromagnetic signals. That is, each element can be configured to have an ON state or OFF state (similar to a light emitting diode (LED) as an example).

Referring now to FIGS. 5C-5D, each of target elements 532*a-h* may include circuitry 550. Circuitry 550 includes an antenna (or antenna element) 551 connected to a first terminal of a switch 552 and to a first low voltage source 554 (e.g., chassis or signal ground). A second terminal of switch 552 is connected to a first terminal of resistor 553, and a second terminal of resistor 553 is connected to a second low voltage source 555 (e.g., chassis or signal ground). In operation, when switch 552 is open (as shown in FIG. 5C), the target element is configured to reflect incident electromagnetic signals (i.e., ON state) since antenna 551 is merely connected to first low voltage source 554. However, when switch 552 is closed (as shown in FIG. 5D), the target element is configured to absorb (or weakly reflect) the incident electromagnetic signals (i.e., OFF state) as antenna 551 is coupled to resistor 553, thereby allowing current to flow through resistor 553 to generate a voltage across resistor 553. In some embodiments, antenna element 551 may be omnidirectional antenna, phased array antenna, passive phased array antenna, or active phased array antenna.

In this way, different radar readable codes can be produced depending on the ON/OFF states of target elements 532a-h. The different radar readable codes, therefore, can be translated into different communication messages. In the example of FIG. 5B, elements 532b-c,h are configured to be ON (i.e., to strongly reflect electromagnetic signals) and elements 532a,d,e-g are configured to be OFF (i.e., to absorb or weakly reflect electromagnetic signals).

Target 515 may be formed with any material, for example plastic, conductive material (e.g., metal), fabric, etc. Target 515 may be mounted on (or attached to) an object, for example a car, a human (e.g., traffic controller), a motorcycle, a bicycle, a bus, a truck, a building, traffic related signs (e.g., stop signs, yield signs), etc. In one embodiment, target 515 may be in the form of a plate, such as a license plate of a vehicle. In another embodiment, target 515 may be a patch attached to a uniform, for example uniform of a traffic controller or a person who directs traffic. In one embodiment, target 515 may include a printed circuit board (PCB) connected or coupled to elements 532a-h.

The selective ON/OFF states of elements 532a-h may be controlled by target controller (or driver) 520. That is, controller 520 may control the switching of switch 552 in each target element. Controller 520 may include one or more general-purpose processors such as a microprocessor, a central processing unit (CPU), or the like. More particularly, controller 520 may include a complex instruction set computing (CISC) microprocessor, reduced instruction set computing (RISC) microprocessor, very long instruction word (VLIW) microprocessor, or processor implementing other instruction sets, or processors implementing a combination of instruction sets. Controller 520 may also be one or more special-purpose processors such as an application specific integrated circuit (ASIC), field programmable gate array (FPGA), a digital signal processor (DSP), or any other type of logic capable of processing instructions. Controller 520 may be implemented as part of target 515 (e.g., part of the PCB) or as a separate device. A user of controller 520 may program the controller with specific programming instructions to toggle switch 552 (i.e., ON/OFF state) of each target element. Alternatively, although not shown in FIG. 5B, the user may interact with a user interface (UI) coupled to controller 520 to set the ON/OFF state of each target element. Based on the combination of ON/OFF states of elements 532a-h (which may be predetermined), when electromagnetic signals hit target 515, elements 532a-h manipulate or cause the reflecting (or bounce back) signals to produce a specific RCS when received and processed by radar unit 201. It should be noted that target elements 532a-h may be of any shape and size, may be any number of elements, and may be disposed anywhere on target 515. Alternatively, in some embodiments, target elements 532a-h may be disposed directly on an object (e.g., a car, a human (e.g., traffic controller), a motorcycle, a bicycle, a bus, a truck, a building, traffic related signs (e.g., stop signs, yield signs), etc.) instead of target 515.

Figure 3:
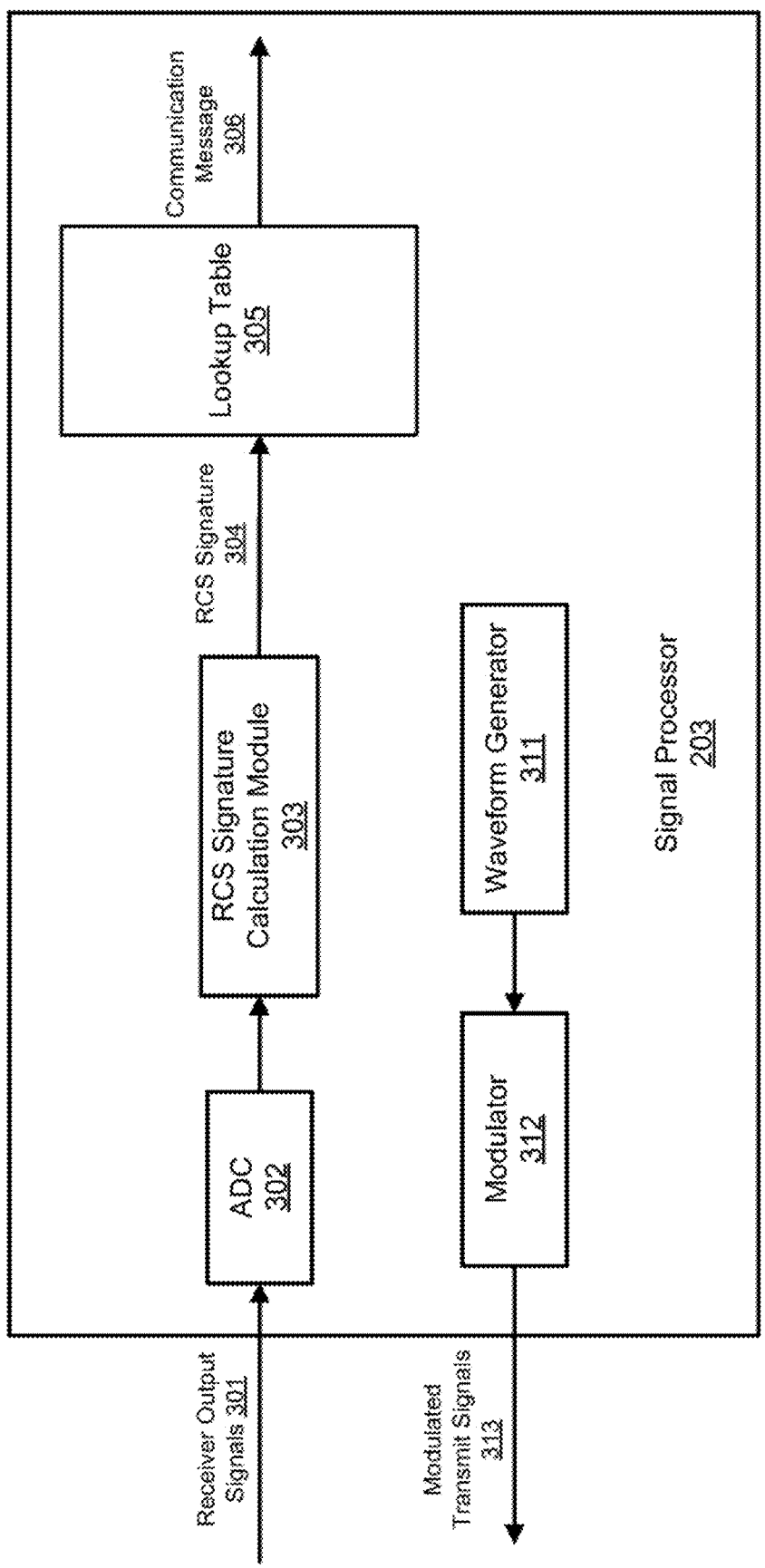
FIG. 3 is a block diagram illustrating a signal processor according to one embodiment.

Referring back to FIG. 2, the reflecting signals are received by antenna 222 and may be amplified by receiver 212. Referring now to FIG. 3, which is a block diagram illustrating a signal processor according to one embodiment, signal processor 203 may include an analog-to-digital converter (ADC) 302, RCS signature calculation module 303, lookup table 305, waveform generator 311, and modulator 312. Signal processor 203 may include one or more general-purpose processors such as a microprocessor, a central processing unit (CPU), or the like. More particularly, signal processor 203 may include a complex instruction set computing (CISC) microprocessor, reduced instruction set computing (RISC) microprocessor, very long instruction word (VLIW) microprocessor, or processor implementing other instruction sets, or processors implementing a combination of instruction sets. Signal processor 203 may also be one or more special-purpose processors such as an application specific integrated circuit (ASIC), field programmable gate array (FPGA), a digital signal processor (DSP), or any other type of logic capable of processing instructions. RCS signature calculation module 303 and lookup table 305 may be stored in a memory (e.g., read-only memory, flash memory, electrically erasable programmable read-only memory (EEPROM), etc.) of signal processor 203.

With continued reference to FIG. 3, receiver output signals 301 from receiver 212 are provided to ADC 302 to convert into digital signals. Based on the converted digital signals, RCS signature calculation module 303 may compute an RCS signature in order to generate a communication message. For example, module 303 may use scattering data (e.g., scattering centers) extracted from the converted digital signals to predict an RCS of a detected target (e.g., target 102, 510 or 515 as previously described). That is, module 303 may analyze the scattering data to predict the RCS, which may be used to compute an RCS signature for the target. Knowing what the RCS signature of a target looks like is helpful in identifying the target. As previously described, the target may include a number of elements disposed in predetermined positions or ON/OFF states in order to manipulate the reflected electromagnetic signals to produce a specific RCS when computed. Such RCS may be high or large RCS for ease of detection, and can be used to compute RCS signature 304, which may be predetermined as target 102 may include target elements configured in predetermined positions or ON/OFF states to form radar readable code 120. RCS signature 304 can be computed using an RCS signature model, which is generally well known to people of skill in the art.

Figure 4:
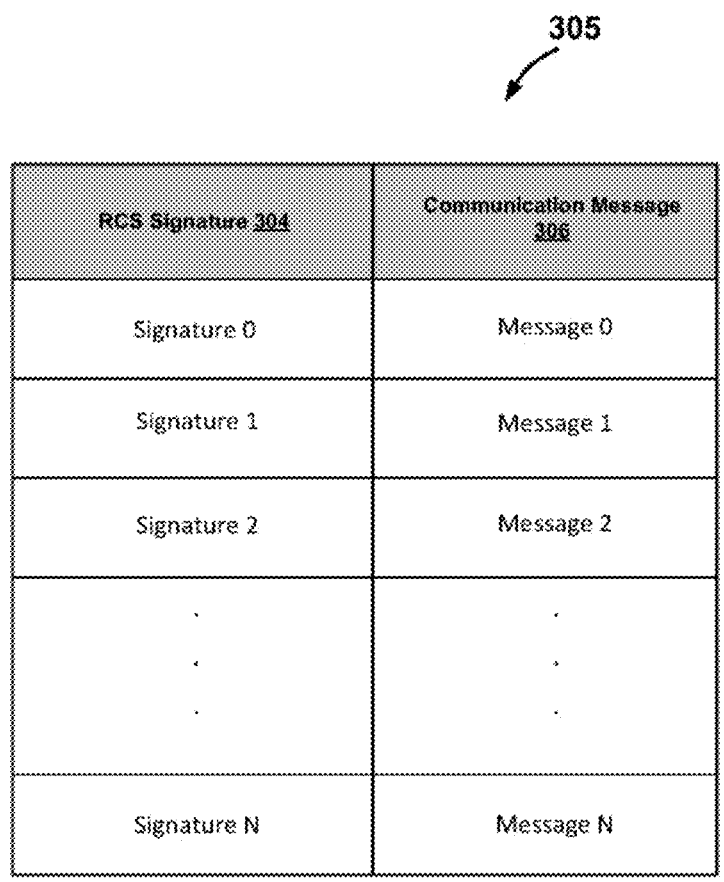
FIG. 4 is a diagram illustrating an example of a lookup table according to one embodiment.

RCS signature 304 may be used as an index into lookup table 305. In that regard, referring now to FIG. 4, which is a diagram illustrating an example of a lookup table according to one embodiment, lookup table 305 may be preconfigured or predefined, e.g., in a laboratory or via a software update to radar unit 201. Lookup table 305 shown includes an RCS signature column 304 and a communication message column 306. Each of the signatures in column 304 is a reference (or index) to obtain a message in column 306. That is, the signature (e.g., Signature 0 . . . N) in a single row of column 304 is mapped to a corresponding communication message (e.g., Message 0 . . . N) in that same row of column 306. As an example, if an RCS signature of "Signature 0" is provided to lookup table 305 as a reference, then "Message 0" is generated as communication message 306. If an RCS signature of "Signature 1" is provided to lookup table 305 as a reference, then "Message 1" is generated as communication message 306, and so on. Communication message 306 may be included as part of radar data generated by signal processor 203. In one embodiment, communication message 306 may include objection information that classifies an object, for example, as a car, a human (e.g., pedestrian, traffic controller), a motorcycle, a bicycle, a bus, a truck, a building, traffic related signs (e.g., stop signs, yield signs), etc. In another embodiment, communication message 306 may include communication information, for example real-time traffic information, such as accidents, detours, street closures, etc.

Referring back now to FIG. 3, waveform generator 311 may generate transmitting signals on a particular frequency (e.g., intermediate frequency). Waveform generator 311 may be a digital waveform generator (DWG) which may be a memory-based arbitrary waveform generator (AWG), which is generally well-known to people of ordinary skill in the art.

Based on the transmitting signals from waveform generator 311, modulator 312 performs modulation (e.g., phase modulation, frequency modulation) that varies one or more properties of the transmitting signals (or carrier signals) with a modulating signal that may contain information to be transmitted. The resulting modulated transmit signals 313 are provided to transmitter 211 for transmission, for example, in radio waves or microwaves.

Figure 6A:
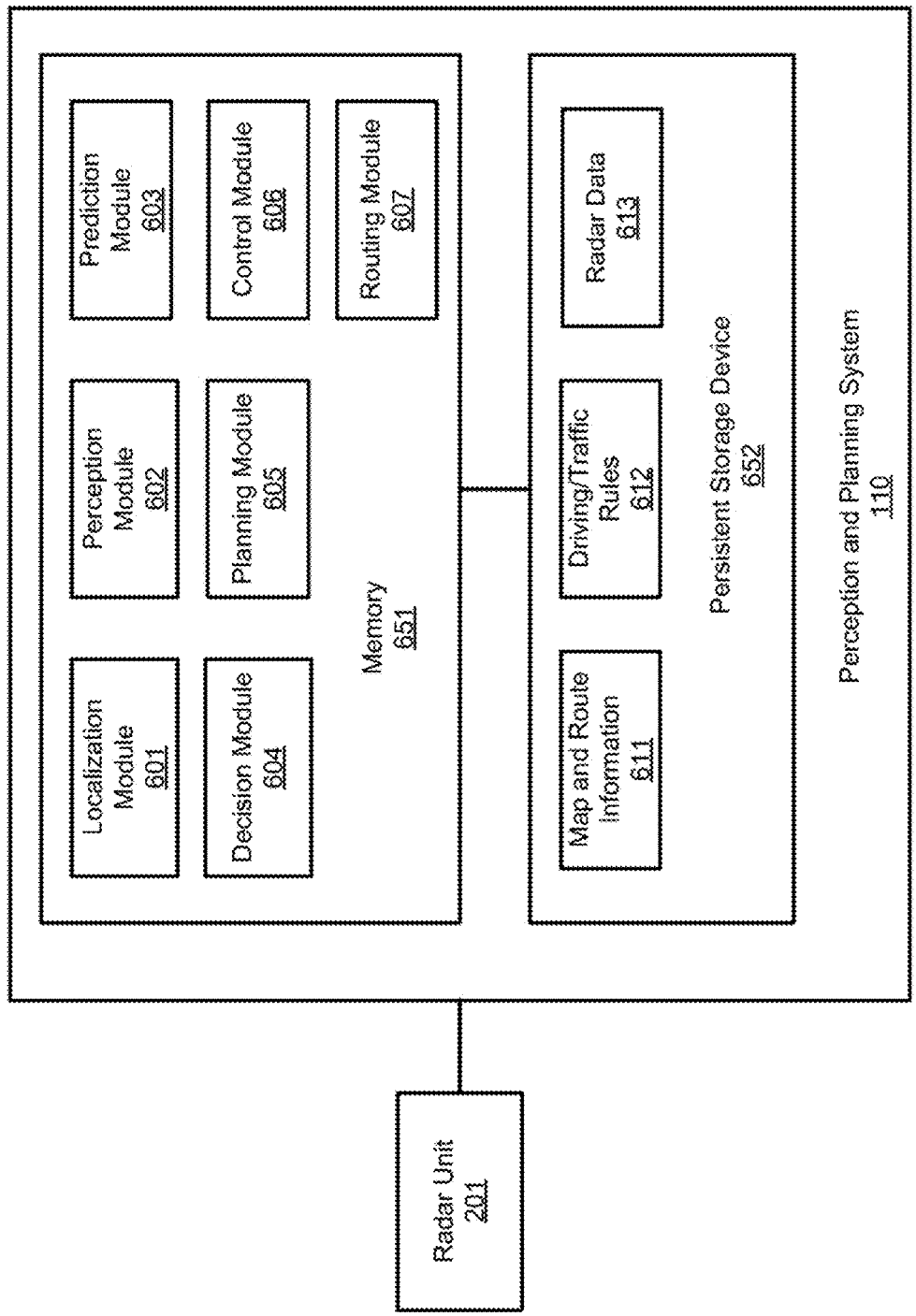
FIGS. 6A-6B are block diagrams illustrating an example of a perception and planning system according to one embodiment.
Figure 6B:
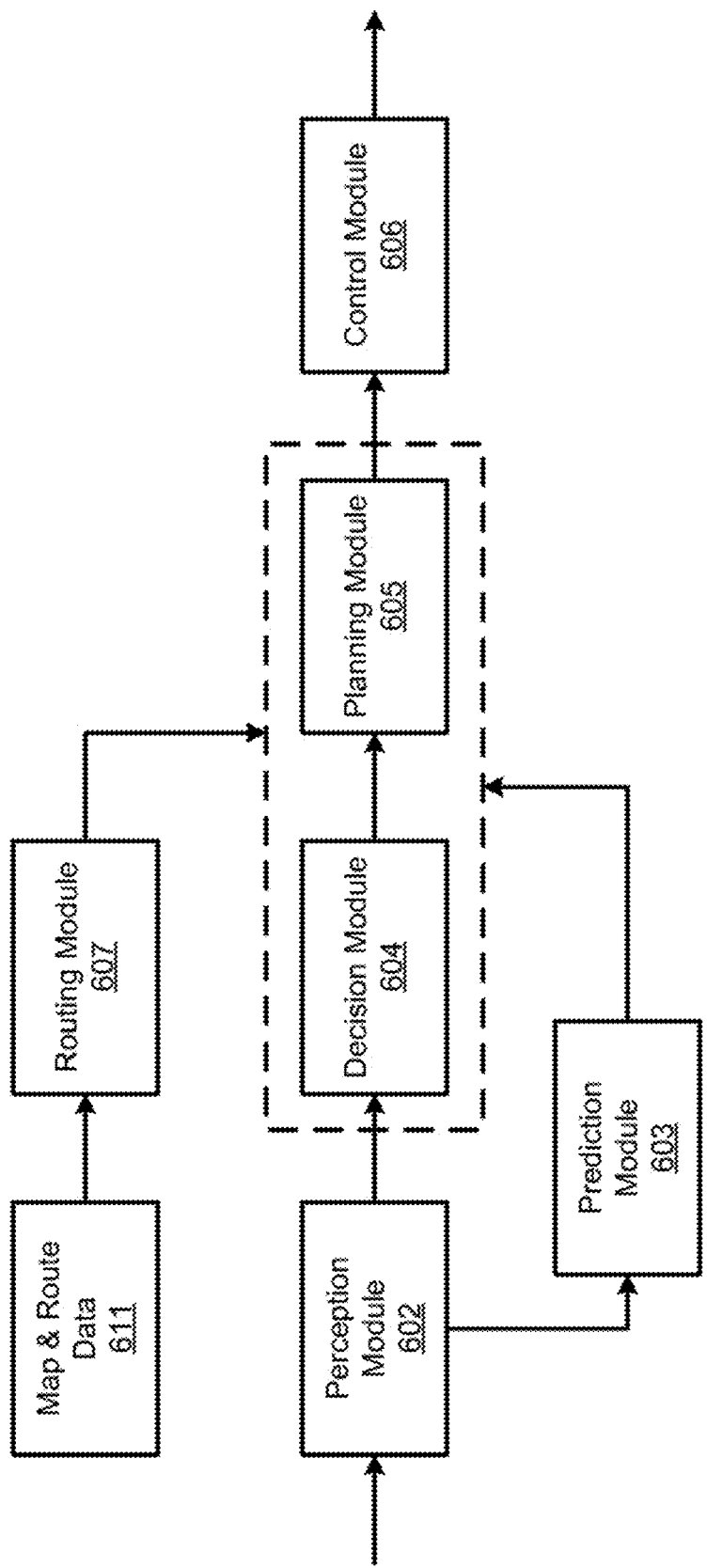

FIGS. 6A-6B are block diagrams illustrating an example of a perception and planning system used with an autonomous vehicle according to one embodiment. In one embodiment, system 600 may be implemented as a part of autonomous vehicle 101 of FIG. 1.

Referring to FIGS. 6A-6B, perception and planning system 110 includes, but is not limited to, localization module 601, perception module 602, prediction module 603, decision module 604, planning module 605, control module 606, routing module 607.

Some or all of modules 601-607 may be implemented in software, hardware, or a combination thereof. For example, these modules may be installed in persistent storage device 652, loaded into memory 651, and executed by one or more processors (not shown). Note that some of modules 601-607 may be integrated together as an integrated module.

Localization module 601 determines a current location of autonomous vehicle 101 and manages any data related to a trip or route of a user. Localization module 601 (also referred to as a map and route module) manages any data related to a trip or route of a user. A user may log in and specify a starting location and a destination of a trip, for example, via a user interface. Localization module 601 communicates with other components of autonomous vehicle 101, such as map and route information 611, to obtain the trip related data. For example, localization module 601 may obtain location and route information from a location server and a map and POI (MPOI) server. A location server provides location services and an MPOI server provides map services and the POIs of certain locations, which may be cached as part of map and route information 611. While autonomous vehicle 101 is moving along the route, localization module 601 may also obtain real-time traffic information from a traffic information system or server.

Based on the sensor data provided by sensor system 115 of vehicle 101, localization information obtained by localization module 601 and stored in persistent storage device 652, a perception of the surrounding environment is determined by perception module 602. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 602 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, the distance of objects, etc. Perception module 602 can also detect objects or targets based on other sensors data provided by other sensors such as a radar and/or light detection and ranging (LIDAR). For example, perception module 602 may receive radar data 613 (stored in persistent storage device 652) from radar unit 201. Radar data 613 may include one or more communication messages, one or more target identifiers (IDs) that respectively correspond to the communication messages, and/or one or more timestamps. In one embodiment, each communication message may include object information of one or more objects, for example a car, a pedestrian, a motorcycle, a bicycle, a bus, a truck, a building, traffic related signs (e.g., stop signs, yield signs), etc. In another embodiment, the communication message may include communication information, for example real-time traffic information or conditions, such as accidents, detours, street closures, etc. Perception module 602 therefore may extract this information from the radar data to identify the objects and/or traffic conditions in the environment.

For each of the objects, prediction module 603 predicts what the object will behave under the circumstances. The prediction is performed based on the perception data perceiving the driving environment at the point in time in view of a set of map/route information 611 and traffic rules 612. For example, if the object is a vehicle at an opposing direction and the current driving environment includes an intersection, prediction module 603 will predict whether the vehicle will likely move straight forward or make a turn. If the perception data indicates that the intersection has no traffic light, prediction module 603 may predict that the vehicle may have to fully stop prior to enter the intersection. If the perception data indicates that the vehicle is currently at a left-turn only lane or a right-turn only lane, prediction module 603 may predict that the vehicle will more likely make a left turn or right turn respectively.

For each of the objects, decision module 604 makes a decision regarding how to handle the object. For example, for a particular object (e.g., another vehicle in a crossing route) as well as its metadata describing the object (e.g., a speed, distance, direction, turning angle), decision module 604 decides how to encounter the object (e.g., overtake, yield, stop, pass). Decision module 604 may make such decisions according to a set of rules such as traffic rules or driving rules 612, which may be stored in persistent storage device 652.

Routing module 607 is configured to provide one or more routes or paths from a starting point to a destination point. For a given trip from a start location to a destination location, for example, received from a user, routing module 607 obtains route and map information 611 and determines all possible routes or paths from the starting location to reach the destination location. Routing module 607 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 604 and/or planning module 605. Decision module 604 and/or planning module 605 examine all of the possible routes to select and modify one of the most optimal routes in view of other data provided by other modules such as traffic conditions from localization module 601 (and/or from radar data 613), driving environment perceived by perception module 602, and traffic condition predicted by prediction module 603. The actual path or route for controlling the ADV may be close to or different from the reference line provided by routing module 607 dependent upon the specific driving environment at the point in time.

Based on a decision for each of the objects perceived, planning module 605 plans a path or route for the autonomous vehicle, as well as driving parameters (e.g., distance, speed, and/or turning angle), using a reference line provided by routing module 607 as a basis. That is, for a given object, decision module 604 decides what to do with the object, while planning module 605 determines how to do it. For example, for a given object, decision module 604 may decide to pass the object, while planning module 605 may determine whether to pass on the left side or right side of the object. Planning and control data is generated by planning module 605 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 606 controls and drives the autonomous vehicle 101, by sending proper commands or signals to a control system of the vehicle, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 605 plans a next route segment or path segment, for example, including a target position and the time required for the ADV to reach the target position. Alternatively, planning module 605 may further specify the specific speed, direction, and/or steering angle, etc. In one embodiment, planning module 605 plans a route segment or path segment for the next predetermined period of time such as 5 seconds. For each planning cycle, planning module 605 plans a target position for the current cycle (e.g., next 5 seconds) based on a target position planned in a previous cycle. Control module 606 then generates one or more control commands (e.g., throttle, brake, steering control commands) based on the planning and control data of the current cycle.

Note that decision module 604 and planning module 605 may be integrated as an integrated module. Decision module 604/planning module 605 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via a user interface system. The navigation system may update the driving path dynamically while the autonomous vehicle is in operation. The navigation system can incorporate data from a GPS system and one or more maps so as to determine the driving path for the autonomous vehicle.

Figure 7:
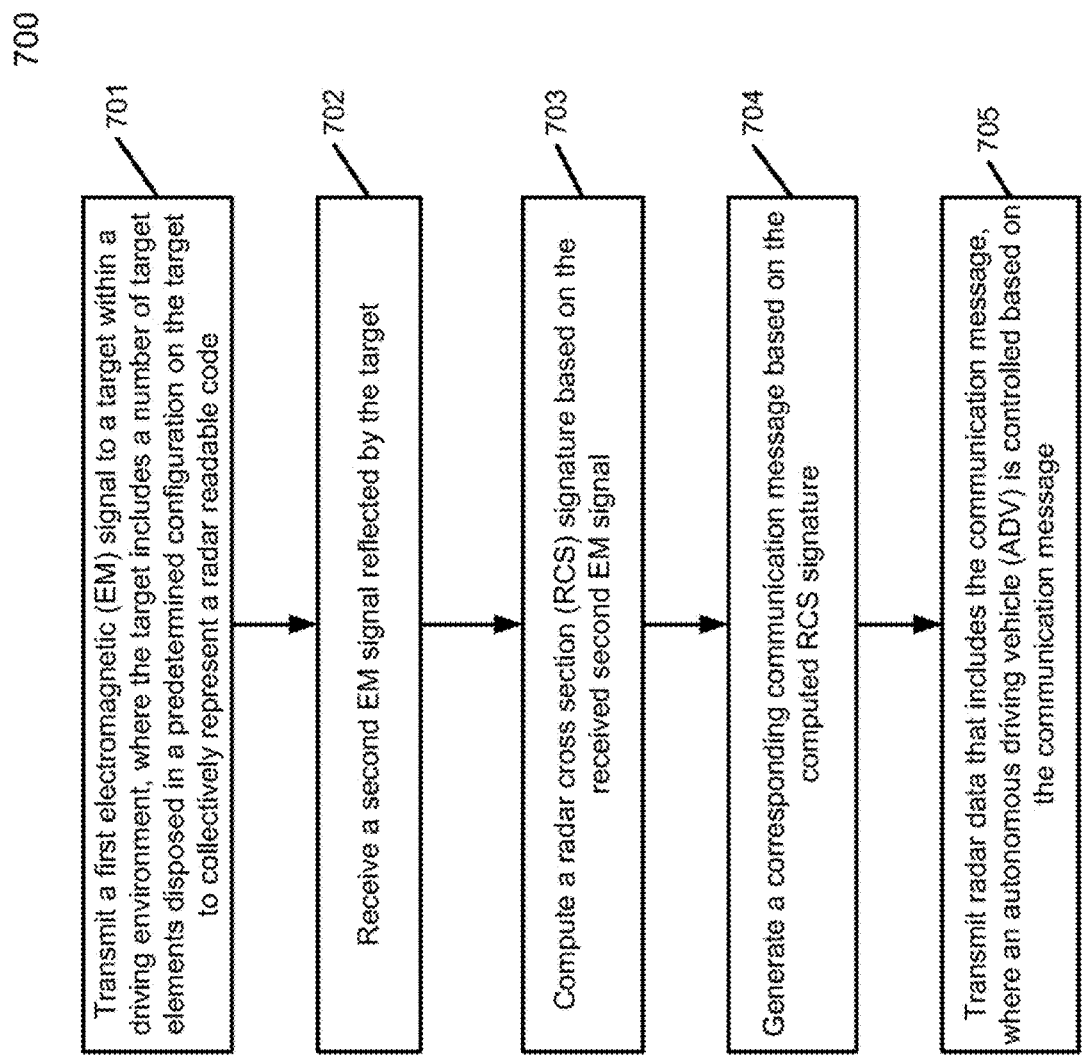
FIG. 7 is a flow diagram illustrating a method for a radar unit according to one embodiment.

FIG. 7 is a flow diagram illustrating a method for a radar unit according to one embodiment. In one embodiment, method 700 may be performed by radar unit 201 of FIG. 2 and may be performed in any desired environment. Referring to FIG. 7, at block 701, a first electromagnetic (EM) signal is transmitted to a target (e.g., target 102, 510 or 515) within a driving environment. At block 702, a second EM signal reflected by the target is received. At block 703, a radar cross section (RCS) signature is computed based on the received second EM signal. At block 704, a communication message is generated based on the computed RCS signature. In one embodiment, the communication message may include object information that classifies an object, for example, as a car, a human (e.g., pedestrian, traffic controller), a motorcycle, a bicycle, a bus, a truck, a building, traffic related signs (e.g., stop signs, yield signs), etc. In another embodiment, the communication message may include communication information, for example real-time traffic information, such as accidents, detours, street closures, etc. At block 705, radar data that includes the communication message is transmitted, for example to a perception and planning system 110 of vehicle 101, to control vehicle 101 based on the communication message.

Figure 8:
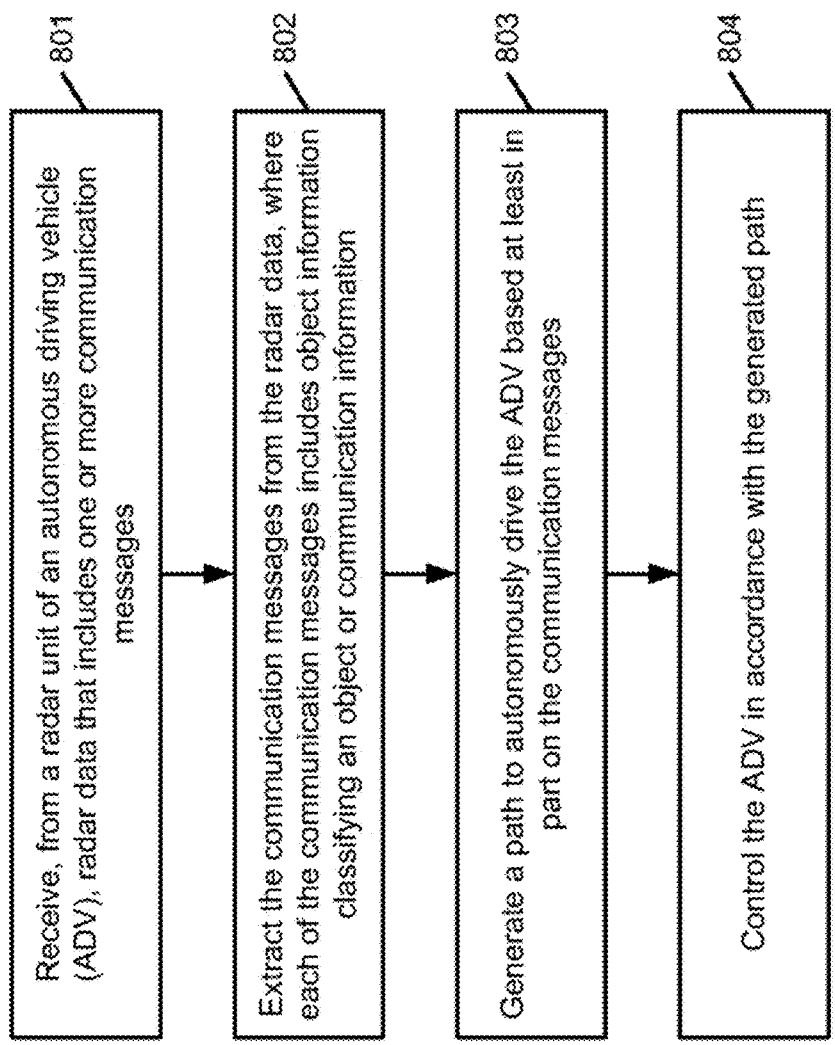
FIG. 8 is a flow diagram illustrating a method of operating an autonomous driving vehicle according to one embodiment.

FIG. 8 is a flow diagram illustrating a method of operating an autonomous driving vehicle according to one embodiment. Process 800 may be performed by processing logic which may include software, hardware, or a combination thereof. For example, process 800 may be performed by the perception and planning system 110 of FIG. 1. Referring to FIG. 8, at block 801, the processing logic receives, from a radar unit (e.g., radar unit 201 of FIG. 2) of an ADV (e.g., vehicle 101), radar data that includes one or more communication messages. At block 802, the processing logic extracts the communication messages from the radar data, where each of the communication messages includes object information classifying an object or communication information. At block 803, the processing logic generates a path to autonomously drive the ADV based at least in part on the communication messages. At block 804, the processing logic controls the ADV in accordance with the generated path.

Note that some or all of the components as shown and described above (e.g., signal processor 203) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
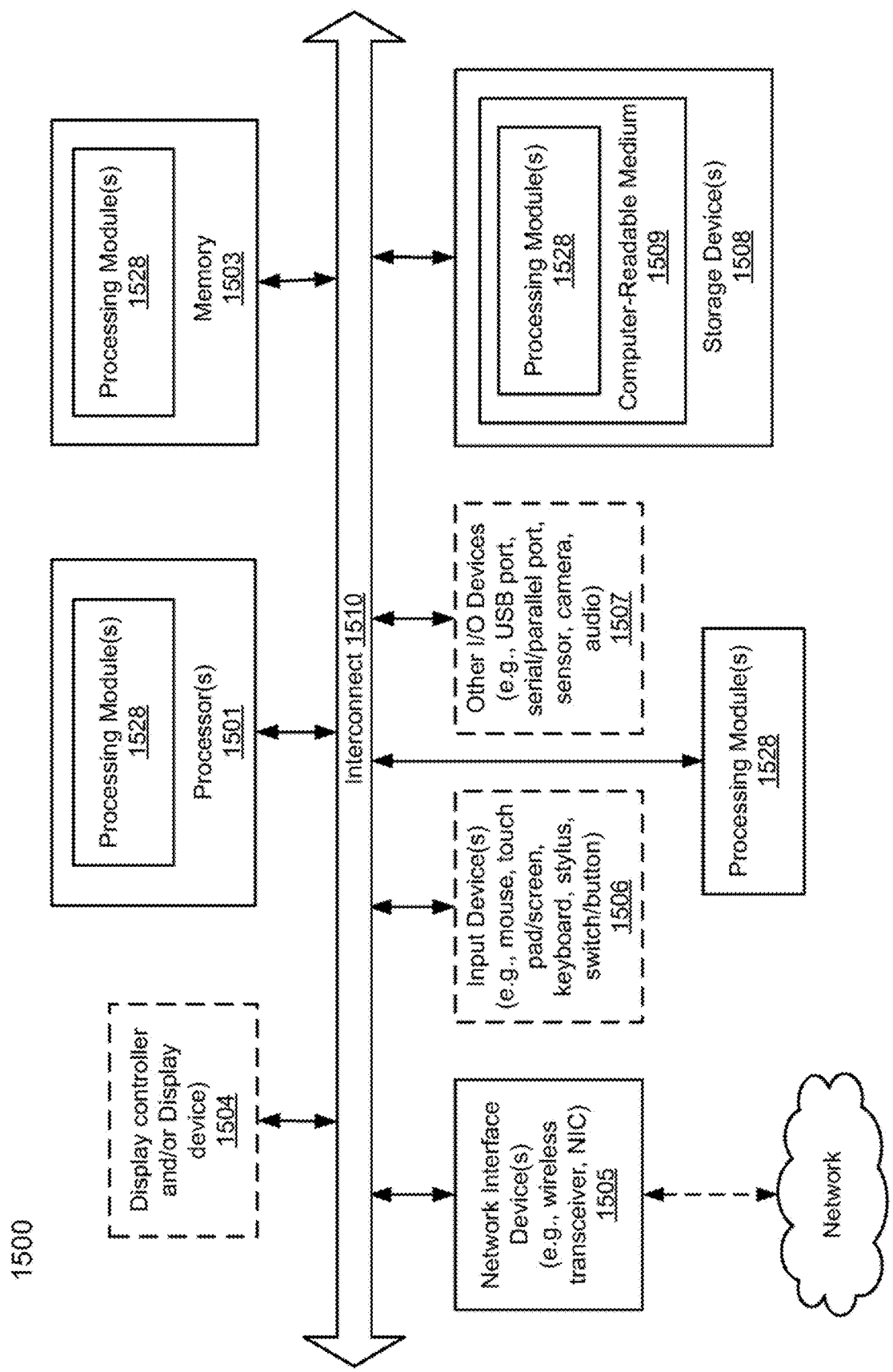
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, localization module 601, perception module 602, and prediction module 603. Processing module/unit/logic 1528 may also represent any module/unit/logic performed by the perception and planning system of the ADV. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A radar system for an autonomous driving vehicle (ADV), comprising:

a radar target that includes a plurality of target elements disposed in a predetermined configuration on the radar target to collectively translate to a communication message; and a radar unit included in the ADV and configured to:
 transmit a first radar signal to the radar target within a driving environment,
 receive a second radar signal reflected by the radar target, the second radar signal having a radar signature corresponding to the communication message, wherein the second radar signal is manipulated by the target elements of the radar target to have the radar signature corresponding to the communication message, and
 use the radar signature of the second radar signal to obtain the communication message, wherein the ADV is controlled based on the communication message;

wherein the target elements are programmable by a target controller that selectively configures each of the target elements to be in an ON state or an OFF state to collectively translate to the communication message.

2. The system of claim 1, wherein the radar target is in a form of a plate or a patch.

3. The system of claim 1, wherein for each of the target elements, the target element reflects radar signals when being configured in the ON state, and absorbs radar signals when being configured in the OFF state.

4. The system of claim 1, wherein the target elements are engravings or indentations on the radar target.

5. The system of claim 1, wherein to use the radar signature of the second radar signal to obtain the communication message, the radar unit is further configured to use the radar signature as an index into a lookup table to obtain the communication message.

6. The system of claim 5, wherein the communication message includes object information classifying an object or communication information.

7. A method performed by a radar unit of an autonomous driving vehicle (ADV), the method comprising:
 transmitting a first radar signal to a radar target within a driving environment, wherein the radar target includes a plurality of target elements disposed in a predetermined configuration on the radar target to collectively translate to a communication message;
 receiving a second radar signal reflected by the radar target, the second radar signal having a radar signature corresponding to the communication message, wherein the second radar signal is manipulated by the target elements of the radar target to have the radar signature corresponding to the communication message; and
 using the radar signature of the second radar signal to obtain the communicate message;
 wherein the ADV is controlled based on the communication message;
 wherein the target elements are programmable by a target controller that selectively configures each of the target elements to be in an ON state or an OFF state to collectively translate to the communication message.

8. The method of claim 7, wherein the radar target is in a form of a plate or a patch.

9. The method of claim 7, wherein for each of the target elements, the target element reflects radar signals when being configured in the ON state, and absorbs radar signals when being configured in the OFF state.

10. The method of claim 7, wherein the target elements are engravings or indentations on the radar target.

11. The method of claim 7, wherein using the radar signature of the second radar signal to obtain the communicate message comprises using the radar signature as an index into a lookup table to obtain the communication message.

12. The method of claim 11, wherein the communication message includes object information classifying an object or communication information.

* * * * *